United States Patent [19]
Murphy, Jr. et al.

[11] Patent Number: 6,061,741
[45] Date of Patent: *May 9, 2000

[54] METHOD AND APPARATUS FOR SYNCHRONIZATION OF CONNECTIONLESS APPLICATIONS ACROSS A NETWORK BY USING SIMPLE ENCRYPTION TOKENS

[75] Inventors: Thomas Edwin Murphy, Jr., Binghamton; Paul Francis Rieth, Apalachin; Jeffrey Scott Stevens, Endwell, all of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/879,376

[22] Filed: Jun. 20, 1997

Related U.S. Application Data

[63] Continuation-in-part of application No. 08/864,052, May 28, 1997.

[51] Int. Cl.⁷ ..................................................... G06F 15/16
[52] U.S. Cl. ........................... 709/248; 709/203; 709/227
[58] Field of Search ................................... 709/217, 218, 709/219, 247, 248, 237, 227, 203, 102, 236, 223; 713/200, 201; 711/216; 380/4, 9, 25

[56] References Cited

U.S. PATENT DOCUMENTS

| | | | |
|---|---|---|---|
| 4,156,867 | 5/1979 | Bench et al. | 340/146.1 |
| 4,346,474 | 8/1982 | Sze | 371/49 |
| 4,510,594 | 4/1985 | Johnson, Jr. | 370/15 |
| 4,516,201 | 5/1985 | Warren et al. | 364/200 |
| 4,577,314 | 3/1986 | Chu et al. | 370/94 |
| 4,638,313 | 1/1987 | Sherwood, Jr. et al. | 340/825.52 |
| 4,688,170 | 8/1987 | Waite et al. | 364/200 |
| 4,849,995 | 7/1989 | Takeo et al. | 375/116 |
| 4,939,741 | 7/1990 | Miyazaki | 371/37.1 |
| 5,095,482 | 3/1992 | Grallert | 371/3 |
| 5,111,461 | 5/1992 | Miyazaki | 371/37.1 |
| 5,131,012 | 7/1992 | Dravida | 375/108 |
| 5,138,620 | 8/1992 | Miyazaki | 371/37.1 |
| 5,267,249 | 11/1993 | Dong | 371/42 |
| 5,282,215 | 1/1994 | Hyodo et al. | 371/42 |
| 5,327,436 | 7/1994 | Miyazaki | 371/37.1 |
| 5,345,451 | 9/1994 | Uriu et al. | 371/42 |
| 5,365,589 | 11/1994 | Gutowitz | 380/43 |
| 5,400,320 | 3/1995 | Tanaka et al. | 370/13 |

(List continued on next page.)

OTHER PUBLICATIONS

Nelson, M. R. "File Verification Using CRC", *Dr. Dobb's Journal*, May 1992, pp. 64–67.

Ritter, T. "The Great CRC Mystery", *Dr. Dobb's Journal*, Feb. 1986, pp. 26–33.

Williams, R. N. *A Painless Guide to CRC Error Detection Algorithms*, copyright 1993 by Ross Williams at ftp.adelaide.edu.au/pub/rocksoft/crc_v3.txt (36 pages).

*Primary Examiner*—Zarni Maung
*Assistant Examiner*—Jason D. Cardone
*Attorney, Agent, or Firm*—Shelley M Beckstrand

[57] ABSTRACT

A client/server and similar system, such as in a TCP/IP or internet or intranet environment, in which CRC encoded tokens are used for synchronization of connectionless applications between the server and client across a network. CRC algorithms are used to hash compress a sequence of bytes which can represent a screen, or panel, or a particular state of a server machine. Responsive to a first request from a client received at a first port, a server establishes a session in listening mode on a second port; generates, stores and returns to the client a session token including a client token and panel token, and closes the first port. Responsive to a second request from a client received at the second port, the server verifies that the second request includes a session token identical to a stored session token indexed by said second port, and if so, executes said second request. The session token, including the client token and panel token, is generated by CRC hashing client and panel indicia, respectively.

15 Claims, 10 Drawing Sheets

U.S. PATENT DOCUMENTS

| | | | |
|---|---|---|---|
| 5,459,722 | 10/1995 | Sherif | 370/60.1 |
| 5,479,654 | 12/1995 | Squibb | 395/600 |
| 5,530,704 | 6/1996 | Gibbons et al. | 370/94.2 |
| 5,649,105 | 7/1997 | Aldred et al. | 709/220 |
| 5,673,317 | 9/1997 | Cooper | 380/23 |
| 5,721,780 | 2/1998 | Ensor et al. | 380/25 |
| 5,796,830 | 8/1998 | Johnson et al. | 380/21 |
| 5,799,088 | 8/1998 | Raike | 380/30 |
| 5,825,890 | 10/1998 | Elgamal et al. | 380/49 |
| 5,987,023 | 11/1999 | Albrow et al. | 370/350 |
| 6,006,266 | 12/1999 | Murphy, Jr. et al. | 709/227 |

METHOD AND APPARATUS FOR SYNCHRONIZATION OF CONNECTIONLESS APPLICATIONS ACROSS A NETWORK BY USING SIMPLE ENCRYPTION TOKENS

CROSS-REFERENCES TO RELATED APPLICATIONS

This application claims priority under 35 U.S.C. § 120 as a continuation-in-part application of related U.S. patent application Ser. No. 08/864,052, filed May 28, 1997, entitled "CRC Hash Compressed Server Object Identifier".

BACKGROUND OF THE INVENTION

1. Technical Field of the Invention

This invention relates to client/server and similar systems, such as in a TCP/IP or internet or intranet environment. In particular, this invention relates to the use of encoded tokens for synchronization of connectionless applications between a server and a client across a network.

2. Background Art

Software applications sometimes require a way to synchronize communications between a client and server. In particular, Internet type applications which are subject to frequent connect/disconnect cycles between client and server applications (and are thus characterized as "connectionless") sometimes need to insure both client and server applications are "in sync" in order to allow some types of transaction processing to continue.

For example, many terminal emulation programs communicate with AS/400 computers using a 5250 architecture protocol. The 5250 architecture has strict protocol requirements regarding how and when data streams are transmitted and received. Terminal emulators function well because, with these programs, the client and server never disconnect and thus know the state or synchrony of each other.

Many new types of Internet servers are being developed which attempt to replace terminal emulators and communicate using, for example, the 5250 architecture protocol. However, since Internet servers are subject to connect/disconnect cycles, a mechanism is needed to insure the client and/or server program can check and see if the other side is in the correct state or "synchronized."

It is an object of the invention to provide a method and apparatus for synchronizing communications between a client and server.

It is a further object of the invention to provide such synchronization while allowing the client and server to disconnect between communication cycles.

It is a further object of the invention to use CRC hash encoding or other simple encoding techniques to provide synchronization tokens for connectionless communications.

SUMMARY OF THE INVENTION

Method and apparatus for synchronizing connectionless applications across a communications network. Responsive to a first request from a client received at a first port, a server establishes a session in listening mode on a second port, generates, stores and returns to the client a session token including a client token and panel token, and closes the first port. Responsive to a second request from a client received at the second port, the server verifies that the second request includes a session token indexed to a stored session token by said second port, and if so, executes said second request. The session token, including the client token and panel token, is generated by encoding client and panel indicia, respectively.

Other features and advantages of this invention will become apparent from the following detailed description of the presently preferred embodiment of the invention, taken in conjunction with the accompanying drawings.

BEST MODE FOR CARRYING OUT THE INVENTION

Figures 1, 1A:
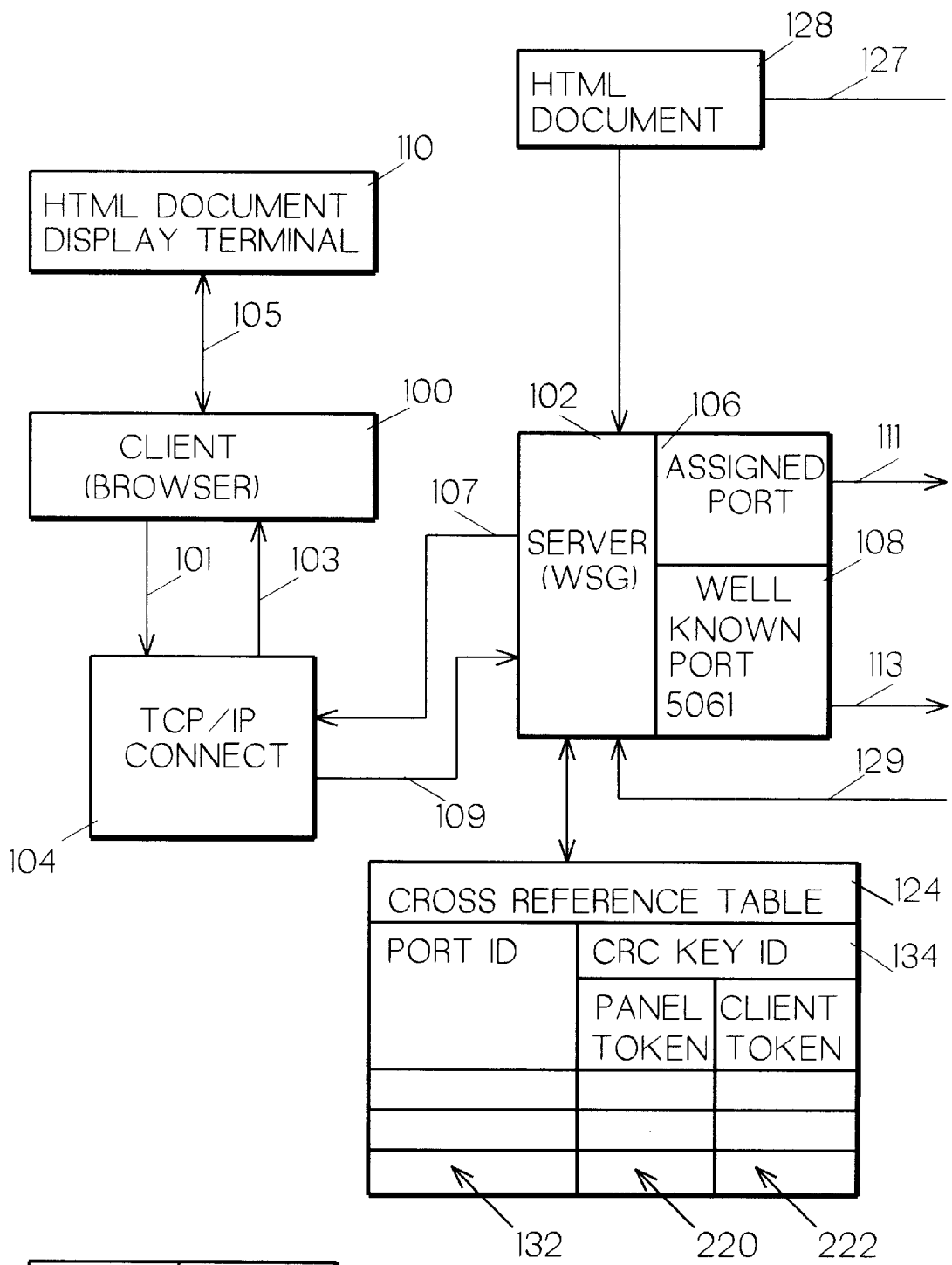
FIGS. 1A and 1B, oriented as shown in FIG. 1, are a system logic diagram of new and existing virtual terminal flow processing in accordance with a preferred embodiment of the invention.
Figure 1B:
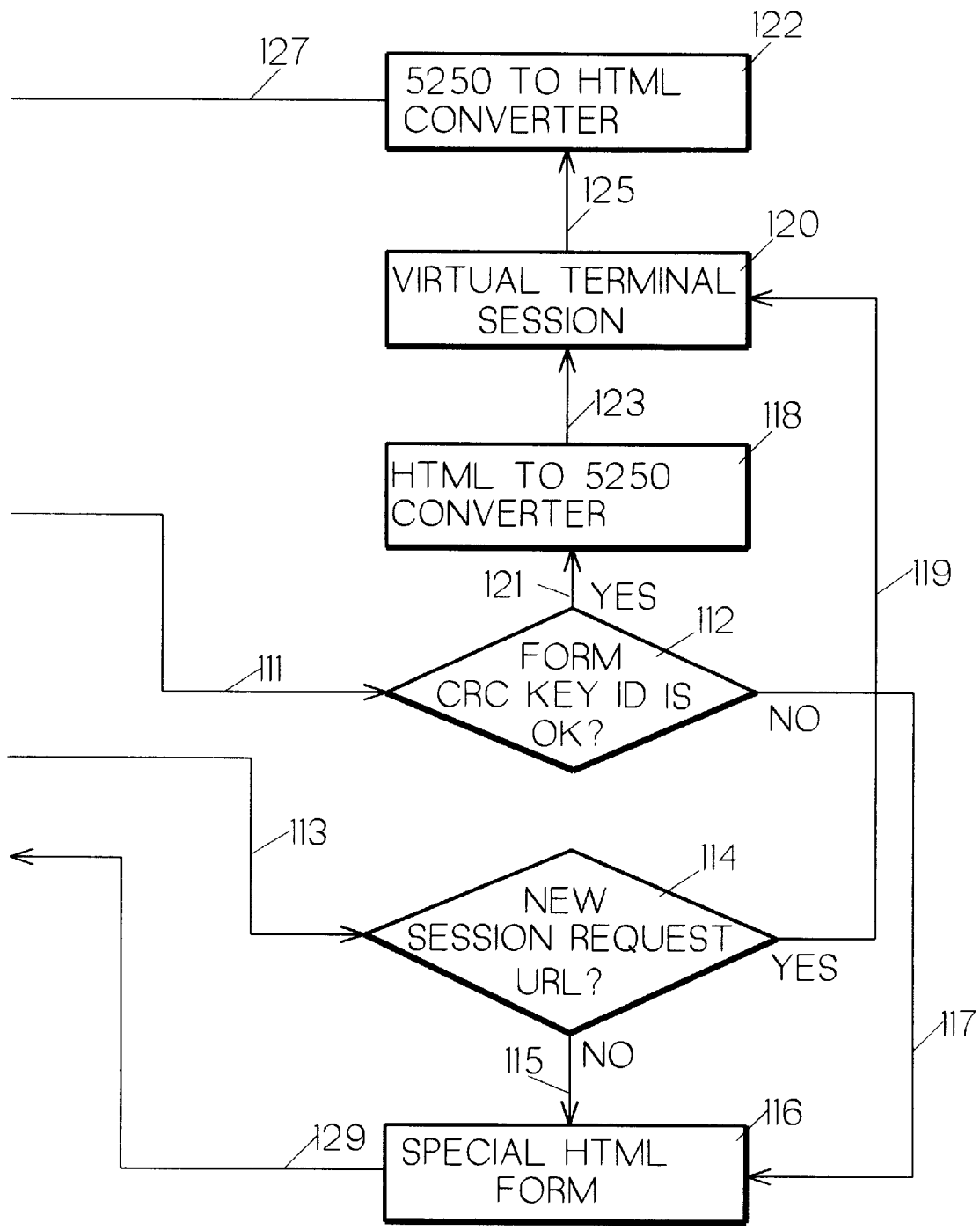

In accordance with an exemplary embodiment the invention, CRC algorithms are used to hash compress a sequence of bytes which can represent a screen, or panel, or a particular state of a server machine. Further, it uses the generated CRC tags to check and enforce proper state between a client and server—i.e., keeps two communicating processes on separate machines synchronized in a timely and cost effective manner.

A "token" is a unique identification string. In accordance with this invention, such a token is used as a signature or timing mark between a client and a server, and is used to synchronize communications between them while allowing connect and disconnect cycles to interrupt communications cycles (also referred to as sessions or transactions) within a series of transactions.

Such tokens also may be used by a software application to tag objects with unique identifiers, such as string of characters or bits, which function as signatures for remote (or local) users. Thus, for example, a remote user must have a signature that matches the tag in order to be authorized to the object. The remote user must also have a signature that does not match any other remote user. Since it is not desirable to use any built-in object security or do other system authorization checking, the tag must be a publicly visible property of the object. In one application of using such tokens, a local object is tagged through its name or description properties. The software application then validates any remote (or local) user requests to manipulate the object by inspecting the tagged property of the object and comparing it with the request from the user. Only those objects which are tagged and have a tag which matches the signature of the remote (or local) user can be manipulated. Even though the tag is publicly visible, it is generated inside the software application, meaning the formula or mechanism used to create at the tag can be kept private. This means that it cannot be known what property or combination of properties of the remote user were used as keys to create the tag. This is important, because the validation or identification of the remote (or local) user is only successful if the software application can recreate the publicly visible tag using the same combination of properties.

In accordance with the present invention client and server software applications exchange a token which indicates if both client and server are synchronized. Ideally, this token must be compressed, simple to implement and quickly built. Speed is important since both client and server programs need to be able to drop the connection quickly in order to complete some types of Intranet or Internet transactions. The invention applies, in particular, to HyperText Transport Protocol, or HTTP, transactions in both internet and intranet environments.

It is not normally feasible to use platform or hardware related security since either or both client and server need to be able to build a token. This means the token is normally a publicly visible property of the communication. For example, it may be visible as one of the HyperText Markup Language (HTML) tags and used as a property of the HTML document that is exchanged by HTTP servers and Web browsers (HTTP clients).

As previously noted, a token is a unique identification string which functions as a signature or timing mark between a client and server. For example, the client may send the token to a server to indicate what point in the 5250 architecture data stream it is currently located. The server, in response, compares the token from the client with the current token it has that represents the actual 5250 data stream location. If the compare shows a match, the server allows the transaction to continue. If the compare does not match, the server knows the client is currently out of sync with the 5250 data stream. Depending on the needs of the application, the server can then send either an error message or a new transaction record with an updated token to the client. Once the transaction is complete, the token is discarded and a new token representing the next transaction is used.

Even though the token is publicly visible, it is generated inside the software application, meaning the formula or mechanism used to create the token can be hidden. When so hidden, it is not publicly known what property or combination of properties were used as keys to create the token. This allows the application developer to prevent or inhibit deconstruction of the token generation algorithms by rogue programs or other clients attempting to subvert legitimate client/server communications.

Thus, it is desirable to create the token in such a way as to prevent other applications or users from being able to reverse engineer or deconstruct the token. In accordance with a preferred embodiment of the invention, this is done by using a Cyclic Redundancy Checking (CRC) calculation using any desirable transaction property when creating the final publicly visible token. The CRC mechanism has the additional benefit of creating compressed tokens which take less storage and are difficult to decode. For example, a 16-bit CRC calculation gives $2^{}16$ or a 1 in 65535 chance of a duplicate 2-byte hexadecimal value token; a 32 bit CRC gives a $2^{}32$ or 1 in 4 billion chance with a 4 byte hexadecimal token.

Cyclic redundancy checking is traditionally used for error detection purposes, primarily for file transfer and communications. The output of a CRC formula is a string of hexadecimal characters or values. Well known CRC formulas for error detection may be adapted for token generation, taking advantage of the CRC ability to create unique and randomized tags. Such unique and randomized tags provide tokens, many tokens, each of which is unique and therefore useful in the software application of the preferred embodiment of the invention.

In accordance with an exemplary embodiment of the invention, a Workstation Gateway (WSG server) on an IBM AS/400 system functions as a terminal emulator across an Intranet or Internet system. Web browsers (clients) on such a system are frequently, if not constantly, connecting and disconnecting with the WSG server. The WSG server communicates the AS/400 system on behalf of a Web browser, using the strict 5250 architecture protocol. Therefore, it is important that transaction data received from the Web browser be in sync with the actual 5250 data stream. The WSG server needs some way to check if the data received is actually part of the current transaction state on the AS/400 system.

Referring now to FIG. 1, a description of the system of the invention will be described. Client 100 and server 102 are separate applications interconnected over communication lines 101, 103, 107 and 109 by TCP/IP connect block 104. Client application is, in this embodiment, an internet or intranet browser connected over lines 105 to an HTML document display terminal and operator input device 110.

Server 102 includes assigned port 106 and well known port 5061 108. Connected to assigned port 106, as is represented by line 111, is comparator 112. Connected to well known port 5061 108, as is represented by line 113, is comparator 114. Communications received at assigned port 106 of work station gateway (WSG), or server, 102 are fed to comparator 112 for checking the form CRC key ID. Communications received at well known port 5061 108 of server 102 are fed to comparator 114 for determining if the communication is a new session request URL. The "yes" output of comparator 112 is fed on line 121 to HTML to 5250 converter block, the output of which is fed on line 123 to virtual terminal session block 120. The "yes" output of comparator 114 is fed on line 119 also to virtual terminal session block 120. The "no" outputs of comparators 112 and 114 are fed on lines 117 and 115, respectively, to special HTML form block 116. The output of virtual terminal session block 120 is fed on line 125 to 5250 to HTML converter 122 and thence on line 127 to server 102. The output of special HTML form block 116 is fed on line 129 to server 102.

Referring further to FIG. 1, in operation for establishing a new session, client 100 connects to server 102 on well-known port 108 using communication lines 101 and 109. A new session request from browser 100 on line 101 is sent as a URL on line 109 to well known port 108 of server 102. An existing session request from browser 100 on line 101 is sent as an HTML document on line 109 to assigned port 106 of server 102.

Server 102 accepts the connect request on line 109, and client 100 sends a new session request Uniform Resource Locator (URL) to server 102. Server 102 executes compare block 114 to inspect the URL for valid syntax to ensure this connect request is a WSG session request. Server 102 branches to line 115 if the syntax is invalid, and in block 116 a special HTML document rejecting the request is returned to client 100 over lines 107 and 103, and no CRC key ID is created. Server 102 branches to line 119 if the syntax is valid, and calls Virtual Terminal APIs 120 to create a virtual terminal session. The output of session 120 is a 5250 data stream that is sent to HTML converter 122. HTML converter 122 inserts the CRC key ID into HTML document 128 as a hidden field (not visible on client browser display terminal 110). Server 102 stores the CRC Key ID 134 and assigned port number 132 in an internal cross-reference table, and sends the HTML document 128 with the CRC key ID to client 100 from port 108 over lines 107, 103 for display at terminal 110. Server 102 then closes the connection to well known port 108. Client 100 displays the HTML document at 110, and closes its connection to port 108.

Referring yet further to FIG. 1, in operation for establishing an existing session, client 100 connects to server 102 on arbitrary assigned port 106 using communication facilities 101, 104 and 109. Server 102 accepts the connect request at port 106, and client 100 sends an HTML document (also called "form") response to server 102. Server 102 executes comparator 112 to inspect the received HTML form for the CRC Key ID, and checks the key against the key 134 in the internal cross reference table 124 using port number 106 as an index 132 into that table. Server 102 branches, as is represented by line 117, to special HTML form block 116 if the key is invalid, and a special HTML document rejecting the request is returned to client 100. If the syntax is valid and the CRC key ID checks ok, server 102 calls, as is represented by line 121, converter 118 to create a 5250 data stream with HTML form data. Data stream 123 is sent to virtual terminal session 120 and virtual terminal screens are there updated. The output of session 120 is a new 5250 data stream that is sent to converter 122. HTML converter 122 converts the data stream 125 to an HTML document, inserting existing CRC key ID into the HTML document on line 127 as a hidden field not visible at client browser 100, 110. Server 102 sends the HTML document with the existing CRC key ID 134 to client 100, stores it in table 124, and closes the connection to port 106. Client 100 displays the HTML document on terminal 110, and closes the connection to port 106.

Figures 2, 2A:
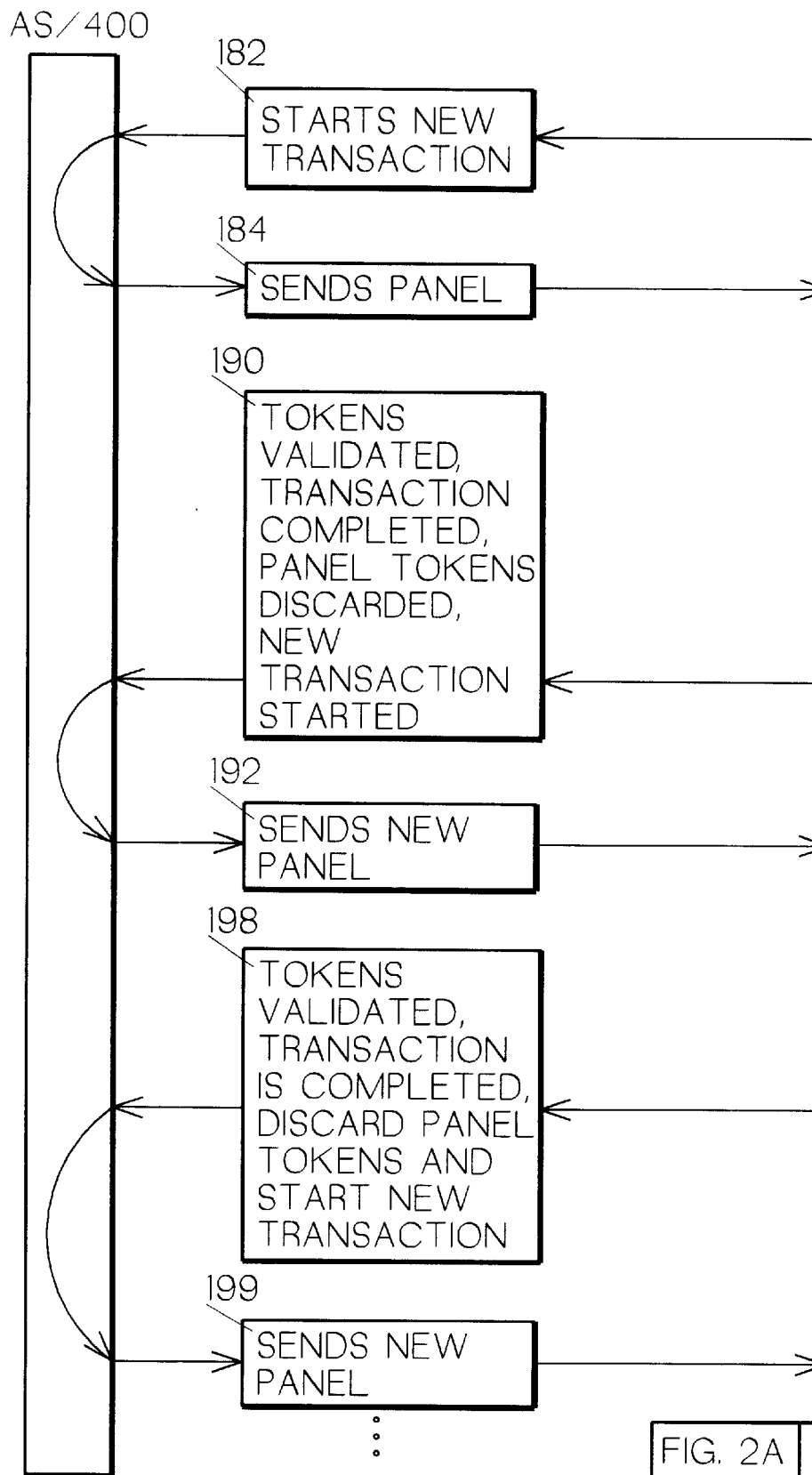
FIGS. 2A AND 2B, oriented as shown in FIG. 2, are a flow diagram of client and server processing in accordance with the method of the invention.
Figure 2B:
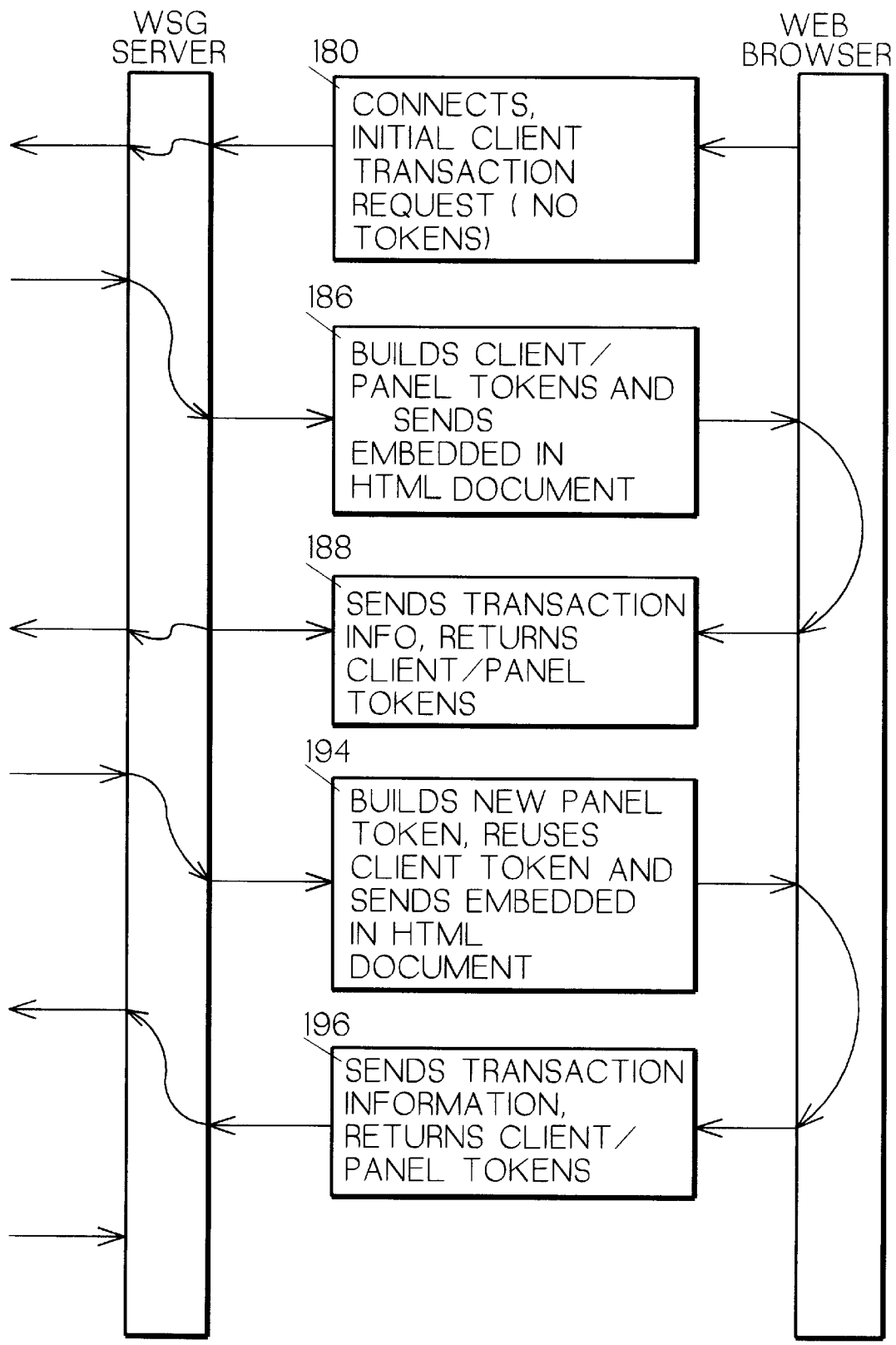

Referring to FIG. 2, the time sequence of operations within client browser 100, workstation gateway server 102, and the server system, in this embodiment an IBM AS/400 computing system, is set forth. In this figure, "tokens" mean the same as CRC key ID 134.

In step 180, browser 100 connects to server 102 with an initial client transaction request, which involves the transfer of no token. In step 182, server 102 starts a new transaction. In step 184 system 130 sends a panel to server 102, which in step 186 builds the client and panel tokens (as will be explained hereafter) and sends them embedded in an HTML document 128 to client 100. In step 188, client 100 sends transaction information to server 102, accompanied by the client and panel tokens. In step 190, server 102 validates the token against token 134, completes the transaction, discards the panel tokens 220 and starts a new transaction. Thereafter, in step 192, system 130 sends a new panel to server 102, which in step 194 builds new panel tokens, reuses the client token 220, and sends these tokens embedded in an HTML document 128 to client 100. Client 100 responds in step 196 by returning the client and panel tokens along with transaction information to server 102. In step 198, server 102 validates the tokens from step 196 against tokens 134, completes this transaction, discards the panel token 220 and starts a new transaction. In step 199, system 130 returns a new panel, the processing continues through a series of connected and disconnected transactions until client 100 concludes.

Figure 3:
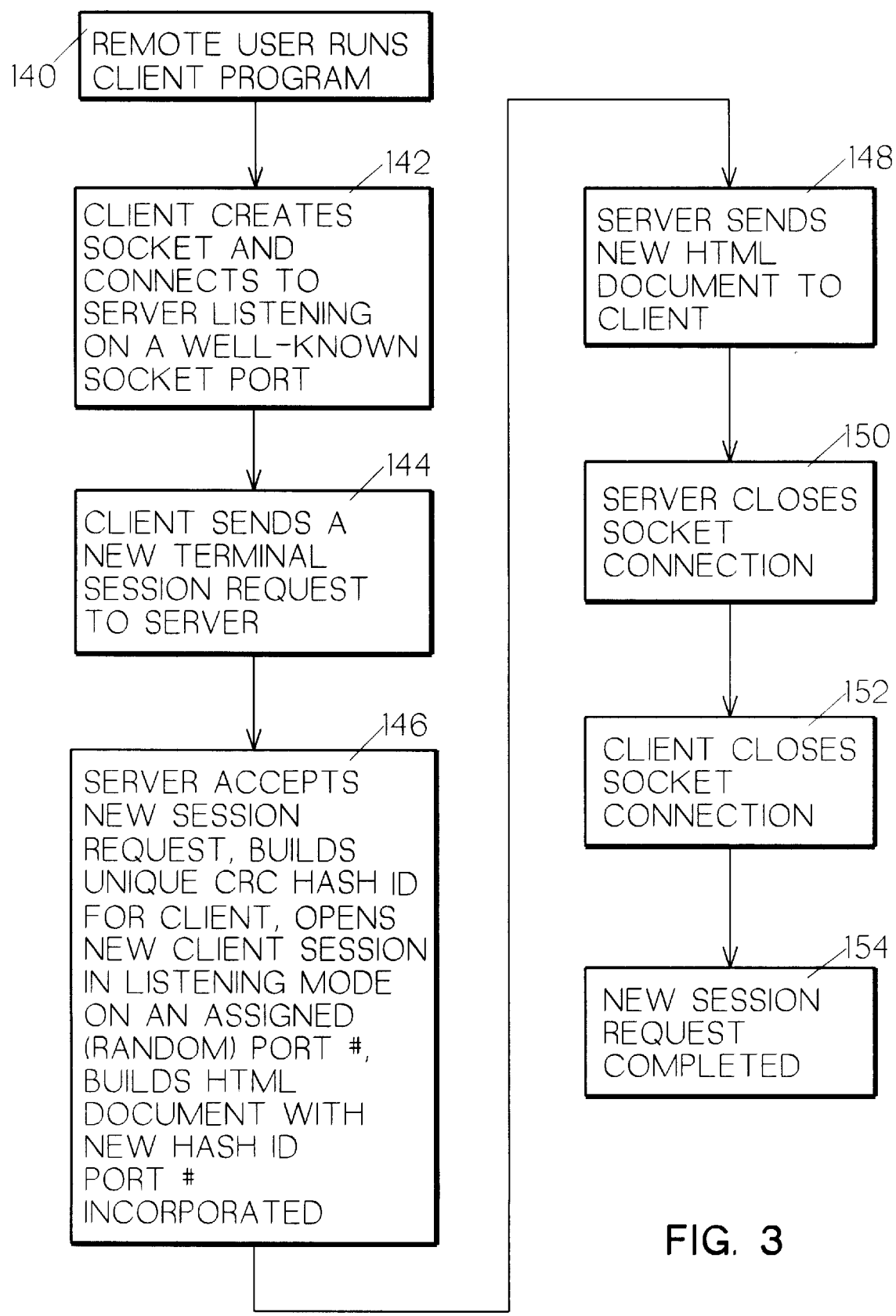
FIG. 3 is flow diagram of new session processing in accordance with method of the invention.

Referring to FIG. 3, the process for establishing a new transaction includes steps 140, 142, 144, 146, 148, 150, 152 and 154, as shown. In step 146, server 102 calls the virtual terminal APIs 120 to create a terminal session and uses the output to build an HTML document 128.

Figure 4:
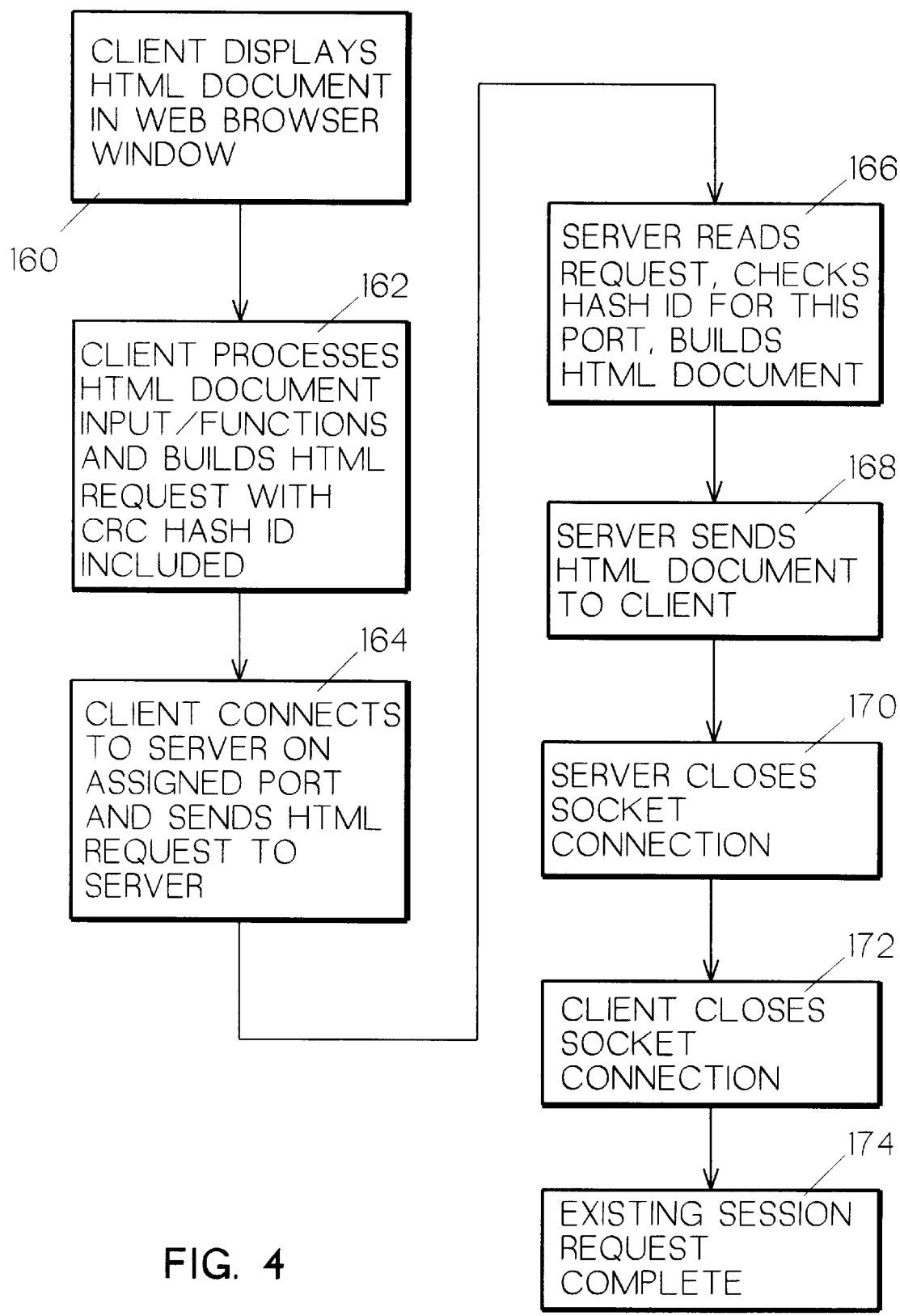
FIG. 4 is a flow diagram of existing session processing in accordance with the method of the invention.

Referring to FIG. 4, the process for establishing an existing transaction includes steps 160, 162, 164, 166, 168, 170, 172 and 174, as shown. In step 166, server 102 calls virtual terminal APIs 120 to update the terminal session and uses the output 125 in converter 122 to build HTML document 128.

To build CRC tokens, any variation of well-known algorithms for calculating CRC's may be used. These normally involve shift registers which process a one dimensional array of variable length by performing a combination of logical EXCLUSIVE OR, NOT and register shifting operations to randomize an initial seed value.

Cyclic Redundancy Checking (CRC) is traditionally used for error detection purposes, primarily for file transfer and communications. The output of a CRC formula is a string of hexadecimal characters or values. In accordance with this exemplary embodiment of this invention well-known public CRC formulas for error detection are incorporated into a tag generation tool, thus taking advantage of the CRC ability to create unique tags or tokens, in instances where a software application requires each remote (or local) user to have a tag that differs from other users. Various CRC algorithms useful in connection with this invention are described in Ritter, T. "The Great CRC Mystery", *Dr. Dobb's Journal*, February 1986, pp. 26–33; Nelson, M. R. "File Verification Using CRC", *Dr. Dobb's Journal*, May 1992, pp. 64–67; and Williams, R. N. "A Painless Guide to CRC Error Detection Algorithms", copyright 1993 by Ross Williams at ftp.adelaide.edu.au/pub/rocksoft/ crc_$_{v b\ 3}$.txt; the teachings of which are incorporated herein by reference.

In accordance with this exemplary embodiment, to speed along the calculation of tokens, a prebuilt table of CRC values is used to implement a quick method to perform the polynomial equation representing CRC calculations.

In one embodiment, the CRC signature is calculated using the following polynomial:

$$X^{}16+X^{}15+X^{}13+X^{}7+X^{}4+X^{}2+X+1.$$

A CRC is normally generated bit by bit. This generation works by shifting into a shift register the XOR of the incoming data bit against the XOR sum of selected bits currently in the register. This is repeated for each data bit. The CRC signature is the register contents when the last data bit is shifted in. For some uses, the resulting value is complemented so that when the CRC value is shifted into the register after the data bits, a known constant signature will be generated IF no data errors are detected.

In an alternative embodiment, a table look up procedure is implemented for calculating he CRC signature. When the XOR of a data byte against an appropriate byte of the register is calculated, the resulting value will be a number in the range 0–255. This represents the number of possible changes that a data byte can cause to the register. A table is created and stored of these resulting values. Then, byte wide calculation of the changes to the register is done by XOR'ing the change from the table against the appropriate bits of the register.

Theoretically, the CRC is calculated by dividing the CRC polynomial into the number represented by all the data bits appended together. The CRC value is the remainder. The likelihood of two numbers resulting in identical signatures is the likelihood of those two numbers having the same remainder. If the data message is less than 64K bits long, the signature ought to be unique. If there are more than 64K bits (8K bytes), then the probability of identical remainders is 1/64K. If a 32 bit signature is used, this probability drops to approximately 1 in 4 billion.

To generate the table, a register simulator is fed each of the 256 possible input bytes. The resulting register value is recorded in the table for use thereafter in calculating the signature.

Figure 5:
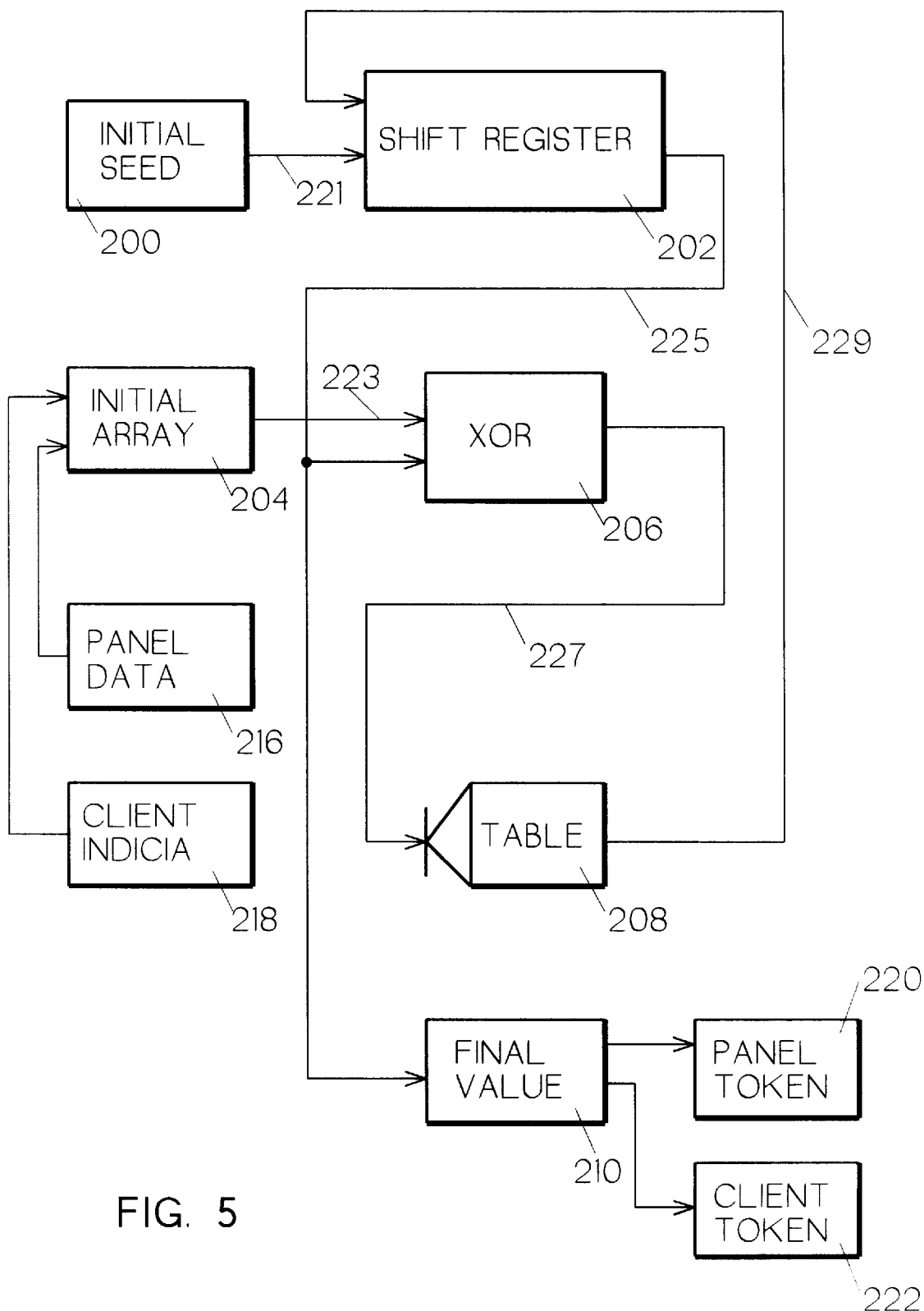
FIG. 5 is a logic flow diagram illustrating a method for generating a compressed CRC tag for identifying and authorizing use of local objects and for checking and enforcing synchronization between communicating client and server processes.

Referring now to FIG. 5, in accordance with a preferred embodiment of the invention, the following steps are executed to generate a CRC key ID:

1. Initial seed 200 is loaded to shift register 202. Initial seed 200 will, in this embodiment, be either panel data 216 or client indicia 218.
2. One-dimensional array 204 and length of the array are received.
3. The first byte of array 204 is EXCLUSIVE OR'd in block 206 with the contents the shift register 202 (at this point, it would be initial seed 200).
4. The calculated value on line 227 is used as an offset into pre-built table 208 to acquire a new value, represented by line 229, which is loaded into shift register 202.
5. The next byte of array 204 is EXCLUSIVE OR'd in block 206 with the contents of shift register 202.
6. Steps 4 and 5 are repeated until the entire length of one-dimensional array 204 is processed in this manner.
7. Final value 210, representing the contents of shift register 202 at the completion of step 6, is the compressed CRC key ID, or token. When operating on panel data 216, the output is panel token 220. When operating on client indicia 218, the output is client token 222.

The resulting token is the natural output of running a variable length string through the CRC generator. A two-byte (4 character) output results from a 16-bit generator, and a four-byte (8 character) output would result from a 32-bit generator. Token 210 is the contents of register 202 after all input characters 204 have been processed. Hashing algorithms other than CRC may also be used.

In this exemplary embodiment, the WSG server insures synchronization by creating a token that is used on a transaction basis. For each transaction, a unique panel token 220 is created. This is done by running the contents 216 of the current panel, which represents the position of the client in the 5250 data stream, through a 32 bit CRC generator which compresses the panel or screen contents into a 4-byte hexadecimal value 220 which identifies the screen. A client token 222 is also generated, using a concatenation of time stamps and other client characteristics, or indicia, 218. This panel token 220 is combined with the client token 222, and together they synchronize the proper client and current panel being used on the Web browser 100 with the real client and real panel that exists on the AS/400 system 130 in table 124. When the transaction is complete, the panel token 220 may be discarded, the client token 222 will be retained, and the next transaction will repeat the cycle using a new panel token 220 and the same client token 222.

The Web browser 100 initiates a transaction by sending an HTTP request to the WSG server 102. The WSG server 102 creates a new token 134 called SESSION for this transaction, and inserts it into the HTTP reply as part of the HTML document 127. The token can be seen as one of the <INPUT> tag properties, called a hidden input field, as follows: <INPUT TYPE="HIDDEN" NAME="SESSION" VALUE="/035FFBFD24D74590/B2214193">

The token 134 value is a concatenation of a client token 222 "035FFBFD24D74590" and a panel token 220 "B2214193", and these are separated by a slash (/) character.

When the Web browser 100 returns the HTML form (or transaction) to the WSG server 102, it also returns the SESSION token. The WSG server compares the value of the SESSION token against the current token 134 it has stored in table 124, and either accepts or rejects the transaction from the Web browser 100. If the transaction is accepted, then the transaction is also completed and the current value of the SESSION token 134 may be discarded. The WSG server builds a new value for the SESSION token 134, stores it in table 124 and inserts it into the HTTP reply as part of the new HTML document 127 it sends to the Web browser.

Figure 6A:
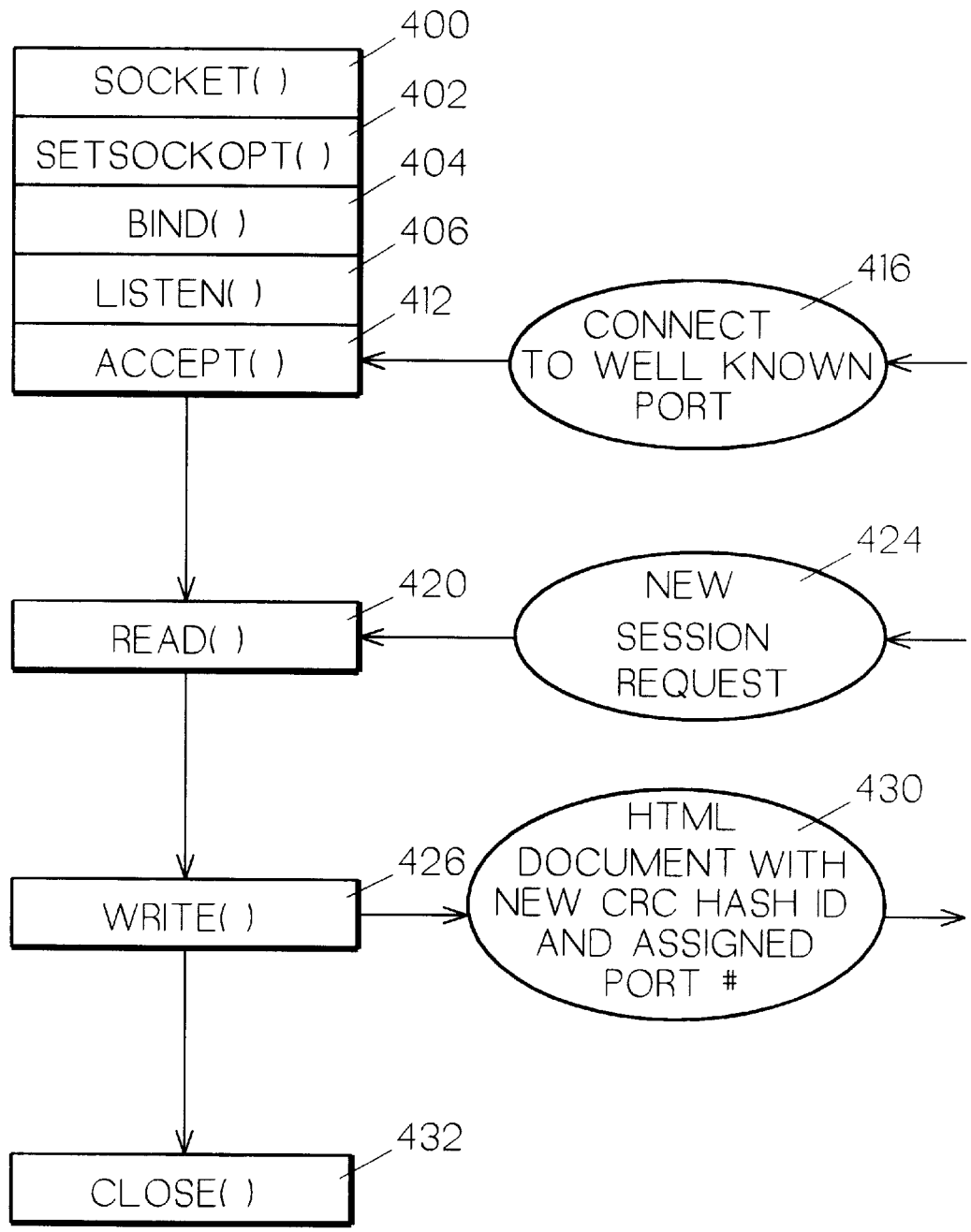
FIGS. 6A and 6B, oriented as shown in FIG. 6, are a flow diagram of a socket program for a new session request in accordance with an exemplary embodiment of the invention.
Figure 6B:
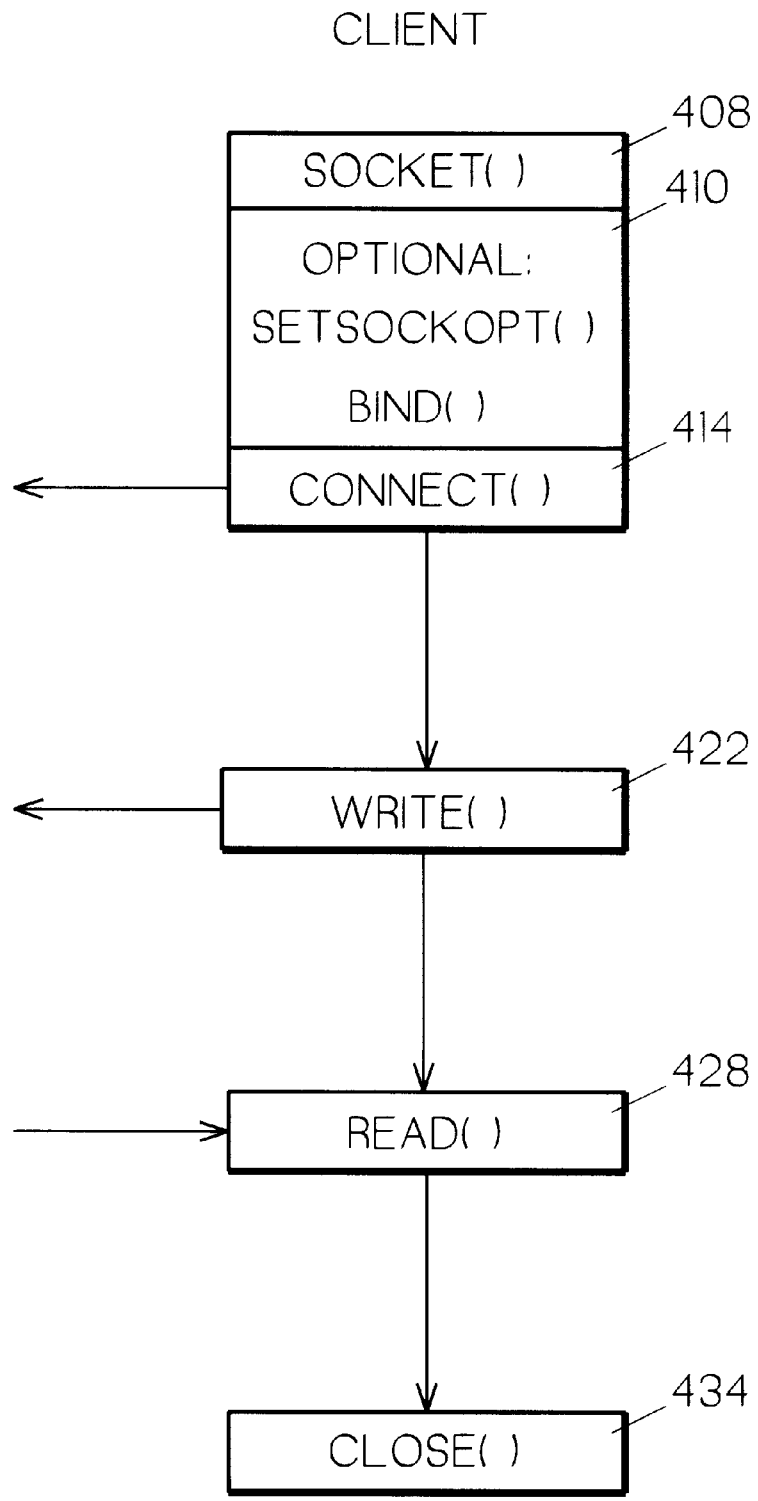

Referring to FIG. 6, a socket program for client/server communications through well known port 5061 108 is set forth for establishing a new transaction.

In steps 400 through 406, server 40 sets up and listens on a well-known socket port, here port 5061. In steps 408 and 410, client 100 creates a socket, and in step 414 sends connect message 416 to server 102. In step 412 server 102 accepts connection request 416, and in steps 422 and 420 the new session request 424 is sent from client 100 and received by server 102. In step 426 server 102 writes, and client 100 reads HTML document 430. In creating document 430, server 102 calls virtual terminal APIs 120 to create a terminal session and uses the output 125 to build HTML document 128, 430. In steps 432 and 434, server 102 and client 100 close connection to well known port 108.

Figure 7:
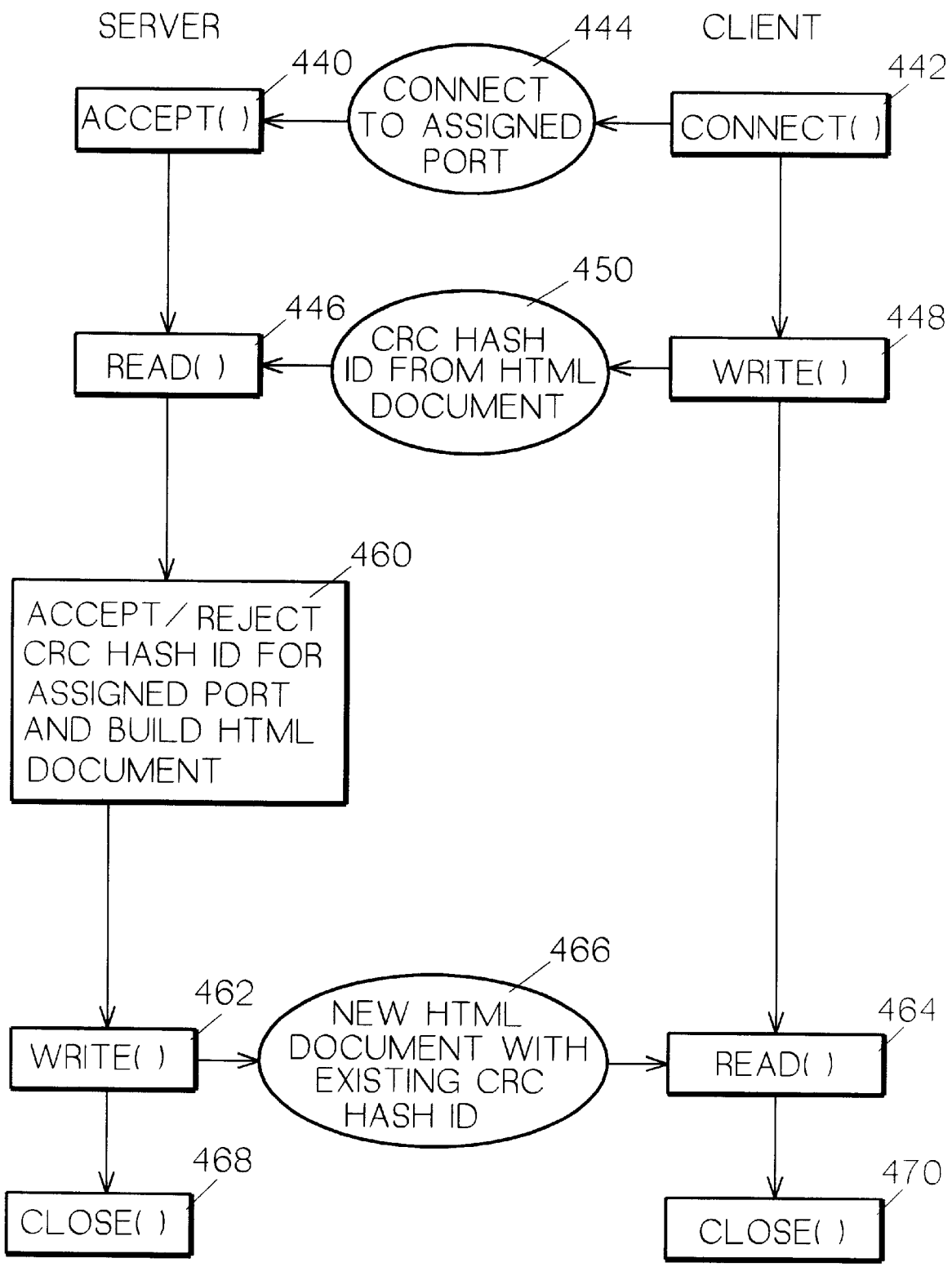
FIG. 7 is a flow diagram of a socket program for an existing session request in accordance with an exemplary embodiment of the invention.

Referring to FIG. 7, a socket program for client/server communications through assigned port 106 is set forth for establishing an existing transaction.

In step 440, server 102 accepts a connect request 444 communicated in step 442 from client 100 to connect to assigned port 106. In steps 448 and 446, client 100 writes and server 102 reads HTML document 128, which includes the CRC hash ID 134. In step 460, server 102 executes comparator 112 against the token 134 indexed by port 106 to the entry in table 124 corresponding to port 132 to accept or reject the CRC hash ID for assigned port 106, and executes blocks 118, 120 and 122 to build HTML document 128, 466. In step 462 and 464, server 102 writes and client 100 reads HTML document 466. Document 466 was created by server 102 calling virtual terminal APIs 120 to update the terminal session and use the output 125 to build HTML document 128, 466. In steps 468 and 470, server 102 and client 100 close their connections to assigned port 106.

Advantages over the Prior Art

It is an advantage of the invention that a method and apparatus are provided for synchronizing communications between a client and server.

It is a further advantage of the invention that such synchronization is provided while allowing the client and server to disconnect between communication cycles, or transactions.

It is a further advantage of the invention that simple encoding techniques, such as CRC algorithms, are used to hash compress a sequence of bytes which can represent a screen, or panel, or a particular state of a server machine. Further, it uses the generated CRC tags to check and enforce proper state between a client and server—i.e., keeps two communicating processes on separate machines synchronized in a timely and cost effective manner.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method of operating a server to synchronize connectionless applications across a communications network, comprising the steps of:

responsive to a first request from a client received at a first port, establishing a server session in listening mode on a second port;

generating, storing and returning to said client a hashed session token including a client token for identifying said client and a panel token for identifying where in an application data stream said client is positioned, and closing said first port;

responsive to a second request from a client received at said second port, verifying that said client is properly positioned within said application data stream with said second request including a session token indexed to a stored session token by said second port, and if so, executing said second request.

2. The method of claim 1 wherein said session token is generated by hashing client and panel indicia respectively.

3. The method of claim 2 wherein said hashing includes the step of CRC encoding said indicia.

4. Method for synchronizing connectionless client/server communications, comprising the steps of:

establishing a connection from a client application to the well known port of a server application;

responsive to a new session request including panel data and client indicia from said client application received at said well known port, establishing a server session in listening mode on an assigned port;

operating said server application to generate, store and communicate to said client application a hashed session token, for identifying where in an application data stream said client application is positioned, and assigned port identifier, and close said well known port;

establishing a connection from said client application to said assigned port;

operating said client application to communicate an existing session request to said server application, said existing session request including a session token;

responsive to said existing session request from said client application received at said second port, operating said server application to verify that said client application is properly positioned within said application data stream with said existing session request including a session token indexed to a stored session token by said second port, and if so, executing said existing session request.

5. The method of claim 4, including the step of operating said server application to generate said session tokens by CRC hash encoding panel data to form a panel token and client indicia to form a client token.

6. The method of claim 5, wherein said executing step includes the further steps of:

generating a new session token by hash encoding new panel data to form a new panel token and concatenating said new panel token with said client token.

7. The method of claim 6, comprising the further steps of:

communicating said new panel token to said client for use in a next transaction.

8. The method of claim 7 wherein said new session request includes a URL and said existing session request comprises a HTML document.

9. The method of claim 8, comprising the further steps of:

responsive to said new session request not including a valid URL, returning to said client a HTML document rejecting said new session request; and responsive to said existing session request not including a valid session token, returning to said client a HTML document rejecting said existing session request.

10. The method of claim 7, comprising the further steps of:

calling virtual terminal APIs to create a virtual terminal session, the output of said virtual terminal session being a 5250 data stream; and converting said 5250 data stream into an HTML document including said session token in a hidden field.

11. Server system for synchronizing connectionless applications across a communications network, comprising:

means responsive to a first request from a client received at a first port for establishing a server session in listening mode on a second port;

means for generating, storing and returning to said client a session token including a client token and panel token, said panel token for identifying where in an application data stream said client if positioned, and closing said first port;

means responsive to a second request from a client received at said second port, for verifying that the client is properly positioned within said application data stream with second request including a session token indexed to a stored session token by said second port, and if so, executing said second request.

12. The server system of claim 11 wherein said means for generating generates said session token by hashing client and panel indicia, respectively.

13. The method of claim 12 wherein said means for generating generates said session token by CRC encoding said indicia.

14. An article of manufacture comprising a computer usable medium having computer readable program code means embodied therein for synchronizing communications between connectionless applications across a client/server network, the computer readable program means in said article of manufacture comprising:

computer readable program code means responsive to a first request from a client received at a first port, for establishing a server session in listening mode on a second port;

computer readable program code means for generating, storing and returning to said client a session token including a client token and a panel token for identifying where in an application data stream said client is positioned, and closing said first port; and computer readable program code means responsive to a second request from a client received at said second port, for verifying that the second request includes a session token indexed to a stored session token by said second port indicating said client is properly positioned within said application data stream, and if so, executing said second request.

15. A program storage device readable by a machine, tangibly embodying a program of instructions executable by a machine to perform method steps for synchronizing communications between connectionless applications across a client/server network, said method steps comprising:

responsive to a first request from a client received at a first port, establishing a server session in listening mode on a second port;

generating, storing and returning to said client a session token for identifying the position of said client within an application data stream, said session token including a client token and panel token, and closing said first port, said session token being a concatenation of a panel token and a client token generated by CRC hash encoding panel data and client indicia, respectively; and responsive to a second request from a client received at said second port, verifying that the second request includes a session token indexed to a stored session token by said second port identifying said second request as properly positioned within said application data stream, and if so, executing said second request.

* * * * *